United States Patent
Ch'ng et al.

(10) Patent No.: US 8,688,809 B2
(45) Date of Patent: Apr. 1, 2014

(54) PROVISIONING PRIVATE ACCESS POINTS FOR WIRELESS NETWORKING (75) Inventors: Shi Baw Ch'ng, North Billerica, MA (US); Ambika Pajjuri, Westford, MA (US)

(73) Assignee: Airvana LP, Chelmsford, MA (US)

( * ) Notice: Subject to any disclaimer, the term of this patent is extended or adjusted under 35 U.S.C. 154(b) by 1282 days.

(21) Appl. No.: 11/640,501

(22) Filed: Dec. 15, 2006

(65) Prior Publication Data
US 2008/0065752 A1 Mar. 13, 2008

Related U.S. Application Data (60) Provisional application No. 60/824,877, filed on Sep. 7, 2006.

(51) Int. Cl.
G06F 15/173 (2006.01)

(52) U.S. Cl.
USPC .............................. 709/221; 709/220; 709/223

(58) Field of Classification Search
USPC ........................................ 709/221, 223, 220
See application file for complete search history.

(56) References Cited

U.S. PATENT DOCUMENTS

| | | | |
|---|---|---|---|
| 5,623,495 A | 4/1997 | Eng et al. | |
| 5,848,063 A | 12/1998 | Weaver et al. | |
| 6,163,524 A | 12/2000 | Magnusson et al. | |
| 6,208,873 B1 | 3/2001 | Black et al. | |
| 6,233,231 B1 | 5/2001 | Felix et al. | |
| 6,272,122 B1 | 8/2001 | Wee | |
| 6,301,484 B1 | 10/2001 | Rogers et al. | |
| 6,317,452 B1 | 11/2001 | Durrant et al. | |
| 6,400,755 B1 | 6/2002 | Harris et al. | |
| 6,560,194 B1 | 5/2003 | Gourgue et al. | |
| 6,597,671 B1 | 7/2003 | Ahmadi et al. | |
| 6,597,677 B1 | 7/2003 | Segawa | |
| 6,615,038 B1 | 9/2003 | Moles et al. | |
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 6,804,216 B1 | 10/2004 | Kuwahara et al. | |
| 6,876,690 B1 | 4/2005 | Imbeni et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |

(Continued)

FOREIGN PATENT DOCUMENTS

| | | |
|---|---|---|
| CN | 101536587 A | 9/2009 |
| EP | 907263 | 4/1999 |

(Continued)

OTHER PUBLICATIONS

U.S. Appl. No. 11/617,298, filed Dec. 28, 2006.

(Continued)

Primary Examiner — Wing F Chan
Assistant Examiner — Andrew Woo
(74) Attorney, Agent, or Firm — Fish & Richardson P.C.

(57) ABSTRACT

In general, in one aspect, instructions are received from a user for management of a network device, the instructions are adjusted for compatibility with requirements of a network provider other than the user, and the adjusted instructions are implemented on the network device.

59 Claims, 4 Drawing Sheets

(56) References Cited

U.S. PATENT DOCUMENTS

| | | |
|---|---|---|
| 7,299,278 B2 | 11/2007 | Ch'ng |
| 8,078,165 B2 | 12/2011 | Mate et al. |
| 8,160,629 B2 | 4/2012 | Mate et al. |
| 8,229,498 B2 | 7/2012 | Ch'Ng et al. |
| 2002/0051437 A1 | 5/2002 | Take |
| 2002/0086658 A1 | 7/2002 | Biedermann |
| 2002/0101943 A1 | 8/2002 | Proctor, Jr. |
| 2002/0167907 A1 | 11/2002 | Sarkar et al. |
| 2002/0196749 A1 | 12/2002 | Eyuboglu et al. |
| 2003/0026225 A1 | 2/2003 | Ogino et al. |
| 2003/0065805 A1* | 4/2003 | Barnes, Jr. ............ 709/231 |
| 2003/0100311 A1 | 5/2003 | Chung et al. |
| 2003/0114180 A1 | 6/2003 | Black et al. |
| 2003/0125026 A1 | 7/2003 | Tsunehara et al. |
| 2004/0076120 A1* | 4/2004 | Ishidoshiro ............ 370/252 |
| 2004/0081134 A1 | 4/2004 | Kotzin |
| 2004/0081144 A1* | 4/2004 | Martin et al. .......... 370/360 |
| 2004/0177270 A1* | 9/2004 | Little et al. ............ 713/200 |
| 2004/0258027 A1 | 12/2004 | Tsybakov et al. |
| 2005/0026640 A1 | 2/2005 | Pan |
| 2005/0099974 A1 | 5/2005 | Kats et al. |
| 2005/0136949 A1 | 6/2005 | Barnes, Jr. |
| 2005/0213555 A1 | 9/2005 | Eyuboglu et al. |
| 2005/0232242 A1* | 10/2005 | Karaoguz et al. ........ 370/352 |
| 2005/0243749 A1 | 11/2005 | Mehrabanzad et al. |
| 2005/0245279 A1 | 11/2005 | Mehrabanzad et al. |
| 2006/0067422 A1 | 3/2006 | Chung |
| 2006/0067451 A1 | 3/2006 | Pollman et al. |
| 2006/0126509 A1 | 6/2006 | Abi-Nassif |
| 2006/0159045 A1 | 7/2006 | Ananthaiyer et al. |
| 2006/0179322 A1 | 8/2006 | Bennett et al. |
| 2006/0203746 A1 | 9/2006 | Maggenti et al. |
| 2006/0209721 A1 | 9/2006 | Mese et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0010261 A1 | 1/2007 | Dravida et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140163 A1 | 6/2007 | Meier et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0213049 A1 | 9/2007 | Bishop |
| 2007/0220573 A1 | 9/2007 | Chiussi et al. |
| 2007/0230392 A1 | 10/2007 | Adams et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2007/0265013 A1 | 11/2007 | Labedz |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2012/0302249 A1 | 11/2012 | Ch'ng et al. |

FOREIGN PATENT DOCUMENTS

| | | |
|---|---|---|
| EP | 2 046 084 A1 | 4/2009 |
| GB | 2456090 | 7/2009 |
| GB | 2456694 A8 | 7/2009 |
| WO | WO98/49844 | 11/1998 |
| WO | WO2007/008574 | 1/2007 |
| WO | WO2008/030933 | 3/2008 |
| WO | WO2008/030934 | 3/2008 |
| WO | WO2008/030956 | 3/2008 |
| WO | WO2008/082985 | 7/2008 |

OTHER PUBLICATIONS

PCT application No. PCT/US2007/088112 filed on Dec. 19, 2007, with Publication No. WO2008/082985, published on Jul. 10, 2008.

International Search Report and Written Opinion mailed Jun. 3, 2008 from PCT application No. PCT/US2007/088112 (13 pages).

Kramer et al., "Building and Measuring a High Performance Network Architecture," Apr. 20, 2001, pp. 31, LBNL Technical Report No. LBNL 47274:WTCK.

3$^{rd}$ Generation Partnership Project "3GPP2", "cdma2000 High Rate Packet Data Air Interface Specification", TIA/EIA/IS-856, C.S0024, version 4.0, Oct. 25, 2002 (548 pages).

3rd Generation Partnership Project "3GPP2", "cdma2000 High Rate Data Air Interface Specification", TIA/EIA/IS-856, C.S0024-A, version 2.0, Jul. 2005 (1227 pages).

3rd Generation Partnership Project "3GPP2", "cdma2000 High Rate Data Air Interface Specification", TIA/EIA/IS-856, C.S0024-B, version 1.0, Apr. 2006 (1623 pages).

Office action from U.S. Appl. No. 11/640,503 mailed Oct. 10, 2008.

International Search Report and Written Opinion mailed Dec. 19, 2008 from PCT application No. PCT/US2007/77755 (12 pages).

International Preliminary Report on Patentability from PCT application No. PCT/US2007/077725 mailed Mar. 19, 2009 (11 pages).

International Preliminary Report on Patentability from PCT application No. PCT/US2007/077722 mailed Mar. 19, 2009 (11 pages).

International Preliminary Report on Patentability from PCT application No. PCT/US2007/077755 mailed Mar. 19, 2009 (8 pages).

Office action from U.S. Appl. No. 11/640,503 mailed May 7, 2009.

International Search Report and Written Opinion from corresponding PCT application No. PCT/US2007/77722 mailed on May 5, 2008 (44 pages).

U.S. Appl. No. 60/824,877, filed Sep. 7, 2006.

U.S. Appl. No. 11/640,415, filed Dec. 15, 2006.

PCT application No. PCT/US2007/77725 filed on Sep. 6, 2007, with Publication No. WO2008/030934.

International Search Report and Written Opinion from related U.S. Appl. No. 11/640,415 with corresponding PCT application No. PCT/US2007/77725, Patent Cooperation Treaty, mailed Mar. 20, 2008, 14 pages.

PCT application No. PCT/US2007/77722 filed on Sep. 6, 2007, with Publication No. WO2008/030933.

U.S. Appl. No. 11/640,503, filed Dec. 15, 2006.

PCT application No. PCT/US2007/077755 filed on Sep. 6, 2007, with Publication No. WO2008/030956.

Office action from U.S. Appl. No. 11/640,415 mailed May 14, 2009.

International Preliminary Report on Patentability from PCT application No. PCT/US2007/088112 mailed Jul. 9, 2009 (7 pages).

Office action and response history of U.S. Appl. No. 11/640,415 to Oct. 9, 2009.

Office action and response history of U.S. Appl. No. 11/640,503 to Oct. 9, 2009.

Examination Report for GB Application No. 0905846.2 mailed Sep. 10, 2009 (2 pages).

Office action and response history of U.S. Appl. No. 11/640,503 to Jan. 6, 2010.

Response filed in GB Application No. 0905846.2 filed on Jan. 8, 2010.

(56) References Cited

OTHER PUBLICATIONS

Office action and response history of U.S. Appl. No. 11/617,298 to Mar. 4, 2010.
Notice of allowance of GB Application No. 0905846.2 mailed on Feb. 16, 2010.
Office action and response history of U.S. Appl. No. 11/617,298 to Nov. 5, 2009.
Office action and response history of U.S. Appl. No. 11/640,415 to Dec. 17, 2009.
Office action and response history of U.S. Appl. No. 11/640,415 to Jul. 26, 2010.
Office action and response history of U.S. Appl. No. 11/640,503 to May 28, 2010.
Office action and response history of U.S. Appl. No. 11/617,298 to Jul. 15, 2010.
Examination Report issued Jul. 26, 2010 from United Kingdom patent application No. GB0905844.7, 2 pages.
USPTO Non Final Office Action in U.S. Appl. No. 11/640,415, dated Oct. 5, 2010, 34 pages.
Fish & Richardson P.C., Response to Final Office action mailed Jul. 15, 2010 in U.S. Appl. No. 11/617,298, filed Oct. 15, 2010, 14 pages.
Fish & Richardson P.C., Response to Non Final Office action mailed Nov. 2, 2011 in U.S. Appl. No. 11/617,298, filed Mar. 2, 2012, 11 pages.
Fish & Richardson P.C., Response to Final Office action mailed Apr. 19, 2011 in U.S. Appl. No. 11/640,415, filed Oct. 19, 2011, 23 pages.
USPTO Non Final Office Action in U.S. Appl. No. 11/617,298, dated Nov. 2, 2011, 14 pages.
Harry Newton, Newton's Telecom Dictionary, Mar. 2007, Flatrion Publishing, 23rd, p. 1006.
USPTO Non Final Office Action in U.S. Appl. No. 11/617,298, dated Jan. 18, 2011, 16 pages.
Fish & Richardson P.C., Response to Non Final Office action mailed Oct. 5, 2010 in U.S. Appl. No. 11/640,415, filed Feb. 7, 2011, 23 pages.
Fish & Richardson P.C., Response to Non Final Office action mailed Jan. 18, 2011 in U.S. Appl. No. 11/617,298, filed Apr. 18, 2011, 10 pages.
USPTO Final Office Action in U.S. Appl. No. 11/640,415, dated Apr. 19, 2011, 38 pages.
USPTO Non Final Office Action in U.S. Appl. No. 11/640,503, dated Feb. 3, 2011, 14 pages.
Fish & Richardson P.C., Response to Non Final Office action mailed Feb. 3, 2011 in U.S. Appl. No. 11/640,503, filed May 3, 2011, 21 pages.
USPTO Final Office Action in U.S. Appl. No. 11/617,298, dated Jun. 23, 2011, 14 pages.
Fish & Richardson P.C., Response to Final Office action mailed Jun. 23, 2011 in U.S. Appl. No. 11/617,298, filed Aug. 23, 2011, 11 pages.
USPTO Notice of Allowance in U.S. Appl. No. 11/640,503, dated Aug. 8, 2011, 8 pages.
USPTO Examiner's Amendment in U.S. Appl. No. 11/640,503, dated Aug. 8, 2011, 1 page.
File history of U.S. Appl. No. 11/640,415 filed Dec. 15, 2006 (retrieved Sep. 9, 2013).
File history of U.S. Appl. No. 11/640,503, filed Dec. 15, 2006 (retrieved Sep. 9, 2013).
File history of U.S. Appl. No. 11/617,298, filed Dec. 28, 2006 (retrieved Sep. 9, 2013).
File history of U.S. Appl. No. 13/555,830, filed Jul. 23, 2012 (retrieved Sep. 9, 2013).
USPTO Non Final Office Action in U.S. Appl. No. 13/555,830, dated Aug. 8, 2013 (12 pages).

* cited by examiner

PROVISIONING PRIVATE ACCESS POINTS FOR WIRELESS NETWORKING

CLAIM OF PRIORITY

This application claims priority under 35 USC §119(e) to U.S. Patent Application Ser. No. 60/824,877, filed on Sep. 7, 2006, the entire contents of which are hereby incorporated by reference.

BACKGROUND

This description relates to provisioning private access points for wireless networking.

Figure 1:
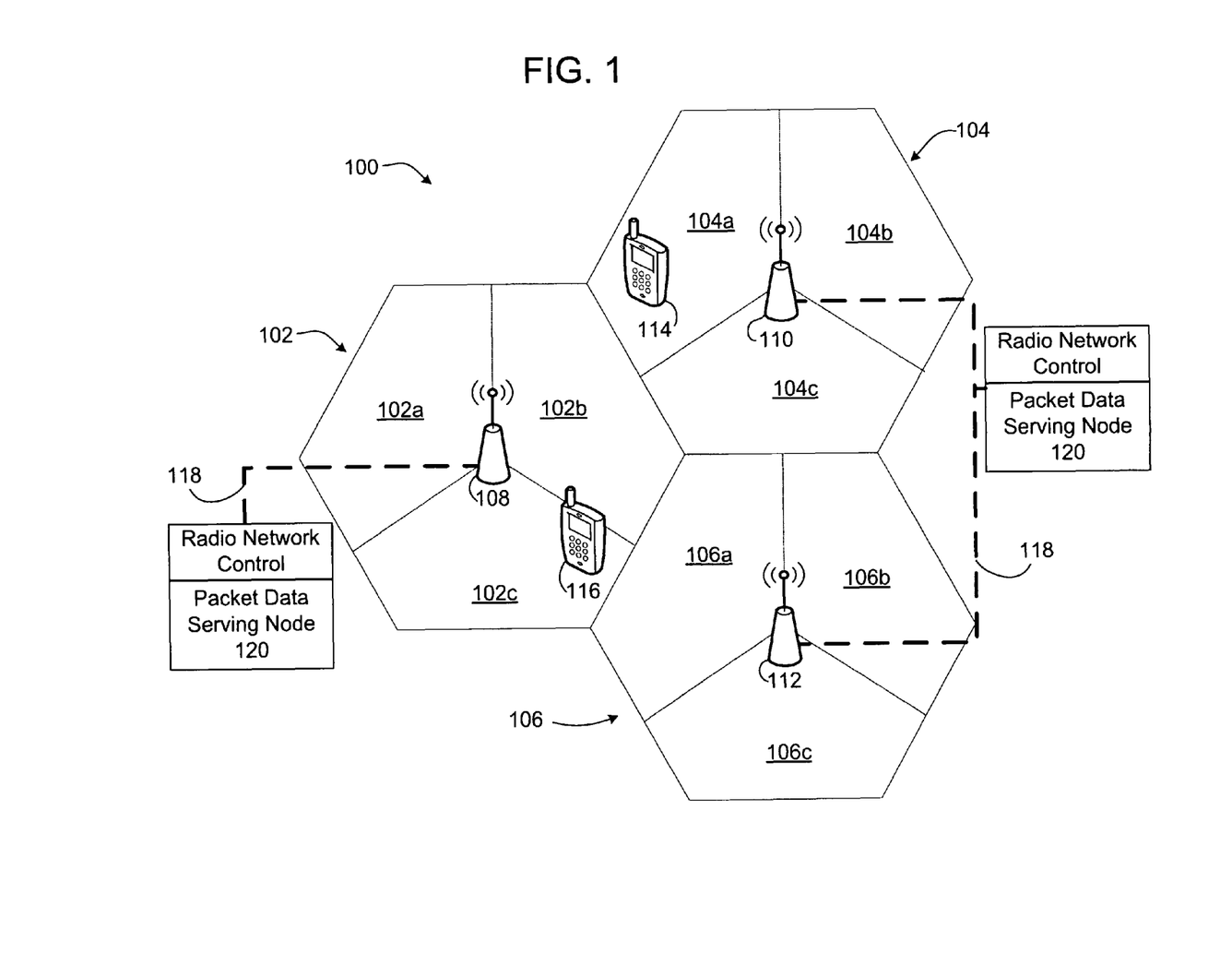
FIG. 1 is a block diagram of a radio access network.

Cellular wireless communications systems are designed to serve many access terminals distributed in a large geographic area by dividing the area into cells, as shown in FIG. 1. At or near the center of each cell 102, 104, 106, a radio network access point 108, 110, 112, also referred to as a base transceiver station (BTS), is located to serve access terminals 114, 116 (e.g., cellular telephones, laptops, PDAs) located in the cell. Each cell is often further divided into sectors 102a-c, 104a-c, 106a-c by using multiple sectorized antennas. A BTS is identified by one or more of several properties, which may include the phase offset of its pilot signal (PN offset), a frequency, or an IP address. A sector may be identified by a SectorID. Together, a PN offset and SectorID may uniquely identify a sector. In each cell, that cell's radio network access point may serve one or more sectors and may communicate with multiple access terminals in its cell.

The 1xEV-DO protocol has been standardized by the Telecommunication Industry Association (TIA) as TIA/EIA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-856-B, 3GPP2 C.S0024-B, version 1.0, May 2006, and is also incorporated herein by reference. Other wireless communication protocols may also be used.

SUMMARY

In general, in one aspect, instructions are received from a user for management of a network device, the instructions are adjusted for compatibility with requirements of a network provider other than the user, and the adjusted instructions are implemented on the network device.

Implementations may include one or more of the following features.

The network device is at least partially under the control of the user. The instructions are received from a portable electronic device. The portable electronic device is a mobile telephone. The portable electronic device is an access terminal connected to a radio access network. The portable electronic device is connected to the radio access network through the network device. Receiving the instructions includes receiving a text message from the user. The text message includes an SMS message. The text message system includes an instant message. Receiving the instructions also includes identifying device management instructions within the text message. Receiving the instructions also includes authenticating the user by processing caller ID information associated with the text message. Receiving the instructions includes authenticating the user as a user authorized to provide instructions. Receiving the instructions includes receiving a text message from the user and authenticating the user that sent the text message as a user authorized to provide instructions. Authenticating the user includes identifying caller ID information associated with the text message, transmitting the caller ID information to an authorization and accounting server, associating a user account with the caller ID information, and confirming that the user account is associated with the network device.

Receiving the instructions includes receiving a text message from the user, and identifying one or more of several network devices associated with the user. Identifying the one or more network devices includes locating within the text message an identification of a network device. identifying the one or more network devices includes locating within the text message an instruction to configure all networking devices associated with the user. Identifying the one or more network devices includes identifying a set of network devices associated with the user and having a particular geographic location.

Adjusting the device management instructions includes identifying within the instructions a list of access terminals, associating each access terminal on the list with a device identification, and generating an instruction that encodes the device identifications. Associating the access terminals with device identifications includes transmitting the list of access terminals to an authorization and accounting server and receiving from the authorization and accounting server a list of access terminal device identifications. The list of access terminals includes a telephone number. Adjusting the device management instructions includes converting the device management instructions into a format usable to set device configuration parameters. Adjusting the device management instructions includes identifying within the instructions an identification of an access terminal, determining a geographic location of the access terminal, determining whether the access terminal is near the network device, and if the access terminal is near the network device generating an instruction that instructs the network device to provide access to the access terminal. Adjusting the device management instructions includes identifying within the instructions an identification of an access terminal, determining whether a technology used by the access terminal is compatible with the network device, if the technology is not compatible, disregarding the device management instruction, and if the technology is compatible, generating an instruction that instructs the network device to provide access to the access terminal. Adjusting the device management instructions includes identifying within the instructions an identification of an access terminal, determining whether the access terminal is authorized to receive services offered by a network operator, if the access terminal is not authorized, disregarding the device management instruction, and if the technology is compatible, generating an instruction that instructs the network device to provide access to the access terminal.

Confirming that the user account is associated with the network device includes associating the user account with a specific network device, and implementing the adjusted instructions includes transmitting the instructions to the specific network device. Implementing the adjusted instructions includes transmitting an authentication signal to the network device, receiving an acknowledgment from the network device, transmitting control parameters to the network device, and instructing the network device to implement controls according to the parameters. Implementing the adjusted instructions includes transmitting a connection request to the network device, and transmitting a list of access terminals to the network device. Implementing the adjusted instructions also includes determining that an acknowledgment was not received from the network device, causing the network device to be reset, and upon determining that the device has been reset, transmitting configuration instructions to the network device. Causing the network device to be reset includes transmitting a failure indication to a text messaging server and causing the text messaging server to transmit an instruction to the user to reset the network device. Determining that the device has been reset includes receiving a transmission from the network device. The configuration instructions include the list of access terminals. The network device is an access point of a radio access network. The radio access network uses an EvDO protocol. The radio access network uses an UMTS protocol.

In general, in some aspects, a text message is received including an identification of an access terminal, the access terminal is associated with a device identification, an instruction is generated that encodes the device identifications, and the instruction is transmitted to cause the network device to provide access to the access terminal.

In general, in some aspects, an access terminal is configured to receive input from a user indicating an instruction for management of an access point of the radio access network, convert the instruction into a text message, and transmit the text message to a network configuration server.

These and other aspects and features and various combinations of them may be expressed as methods, apparatus, systems, means for performing functions, program products, and in other ways.

The described techniques have several advantages. Security is enhanced by reducing the number of network ports that must remain open to allow configuration of the system. Because the network operator retains control, it can ensure that only a provisioning configuration that is fully compatible with its network services is committed to the home networking device. Web-based and text-message-based interfaces are familiar to users and require little training for them to operate.

Other features and advantages will be apparent from the description a the claims.

DETAILED DESCRIPTION

Referring to FIG. 1, a radio access network (RAN) 100 uses an Ev-DO protocol to transmit data packets between an access terminal, e.g., access terminal 114 and 116, and a radio network access point, e.g., access points 108, 110, 112. The access points are connected over a backhaul connection 118 to radio network control/packet data serving nodes (RNC/PDSN) 120, which may be one or more physical devices at different locations.

Figure 2:
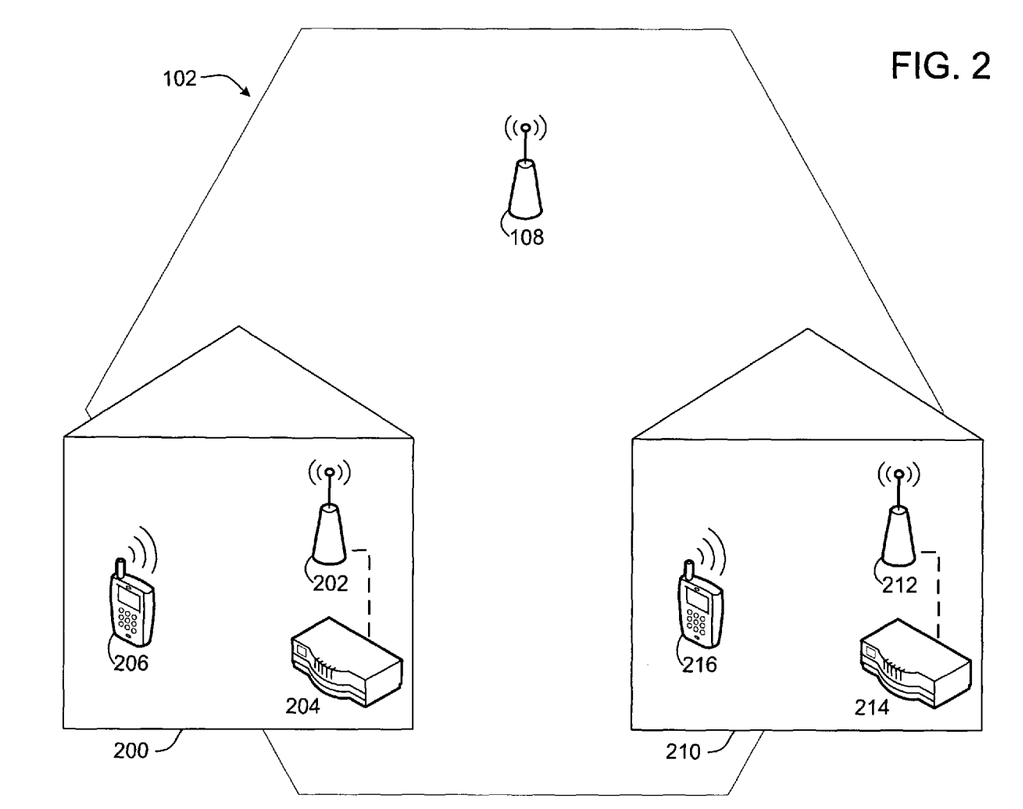
FIG. 2 is a block diagram of a home networking deployment.

In some examples, as shown in FIG. 2, a radio network access point 202 may be deployed in a user's home 200 in a similar manner as a WiFi® access point. Such a radio network access point is referred to as a private access point. The private access point 202 may use an available high-speed internet connection, such as DSL or cable modem 204, as the backhaul with the RNC/PDSN functionality implemented in the private access point 202. Such a private access point may be installed anywhere that it is advantageous to do so, for example, in an office, a public space, or a restaurant. When this description refers to a private access point being in a "home" that encompasses any such location. A private access point is different from a picocell access point in that it may be intended to only provide access for the user that installs it in his home or those he authorizes, as opposed to a picocell which may serve a similar venue but provides access to any subscriber of the network. In some examples, a private access point may be integrated into a cable modem or other network hardware, such as a router or WiFi access point.

When an authorized access terminal 206 is present inside the home (or anywhere within range of the private access point 202), it uses the private access point 202 rather than a regular cellular radio network access point such as access point 108 to place or receive voice calls and data connections, even if it is otherwise within the cell 102 for that access point 108. We sometimes refer to the standard access point 108 as a macro access point or macro BTS to distinguish it from a private access point, as it provides direct access to the wider RAN. A neighboring home 210 may have its own private access point 212 connected to its cable modem 214 for use by its owner's access terminal 216. A private access point deployment is different than traditional radio network deployment because neighboring private access points are intended to operate independently, in part because real-time communications is difficult between neighboring private access points. The intended private access point deployment is also different than WiFi deployment in that it is intended to operate in licensed spectrum. Some details and examples are discussed in co-pending application Ser. No. 11/640,415, titled Controlling Reverse Link Interference in Private Access Points for Wireless Networking, filed Dec. 15, 2006, and Ser. No. 11/640,503, titled Configuring Preferred User Zone Lists for Private Access Points for Wireless Networking, filed Dec. 15, 2006, which are incorporated here by reference.

Access lists of authorized access terminals for each private access point can be configured on a central server and distributed to the private access points. Information to locate and access the private access points can be distributed to access terminals using an over-the-air parameter administration (OTAPA) system. Access terminals may also retrieve access information from the configuration server themselves. A mobile internet protocol (mobile IP) can be used along with voice call continuity (VCC) for handoffs between private access points. Although this description uses terminology from EV-DO standards, the same concepts are applicable to other communication methods, including GSM, UMTS, HSDPA, WiMax, WiBro, WiFi, and the like. For example, when we refer to a reverse power control (RPC) signal, this should be taken to refer to any signal used by a base station to control power levels of an access terminal.

User-Directed Service Provisioning

Provisioning refers to defining sets of access terminals that should use a particular access point and related configuration activities. Personal access points can benefit from a user-friendly provisioning system that can allow the end-user to direct which other users should be allowed to have access to a particular private access point. This is advantageous because it allows owners to control who accesses their hardware, but at the same time, the network operator is able to maintain some amount of control over how its network is accessed. In existing systems, web-based configuration interfaces are sometimes hosted by the device under configuration, for example, home routers manufactured by the LinkSys® division of Cisco Systems, Inc., of San Jose, Calif., allow end-users to restrict access to their home Ethernet or WiFi routers by providing a web-based user interface hosted on those same routers. An end user can connect his personal computer, equipped with web-browser software, to his home router and configure its access list and other settings through a locally-generated web page. Such home routers are not operator-managed; they are managed by the end-users themselves. Many home-networking access products operate in this fashion. In other systems, configuration is done using custom client applications, for example, the AirPort® wireless access point from Apple Computer, Inc., of Cupertino, Calif., is configured using software that is built and provided by Apple for the specific purpose of managing such access points. Such home networking devices are also managed by the end-users themselves, not the operator of the wide-area network to which they may be attached. Many other home-networking products operate in this fashion as well.

In the description below, a system enables end-users to provision a home networking device such as a personal access point in a user-friendly manner, yet allows the network operator to manage and retain final control over the device. Two primary methods are described: one through an operator-hosted web-based interface, the other using SMS text messaging terminated by the operator's text messaging application server. These methods may be implemented independently or in combination.

Such user-based provisioning has several advantages. Because the end-user does not configure the home networking device directly, one fewer networking port needs to be opened (i.e., a port for accessing the device directly through a web browser) and the home networking device will be more secure, more "hack-proof" for it. Web-browsing and text-messaging are common and familiar interfaces for many end users providing user friendliness and ease of use.

To provide access to a radio access network, a personal base station needs to be provisioned and configured in a way that is compatible with the services provided by the network operator. Using this system, because configuration is done through an operator-managed interface and the device is ultimately left operator-managed, the operator can ensure that only a provisioning configuration that is fully compatible with its network service is used on the personal base station.

Figure 3:
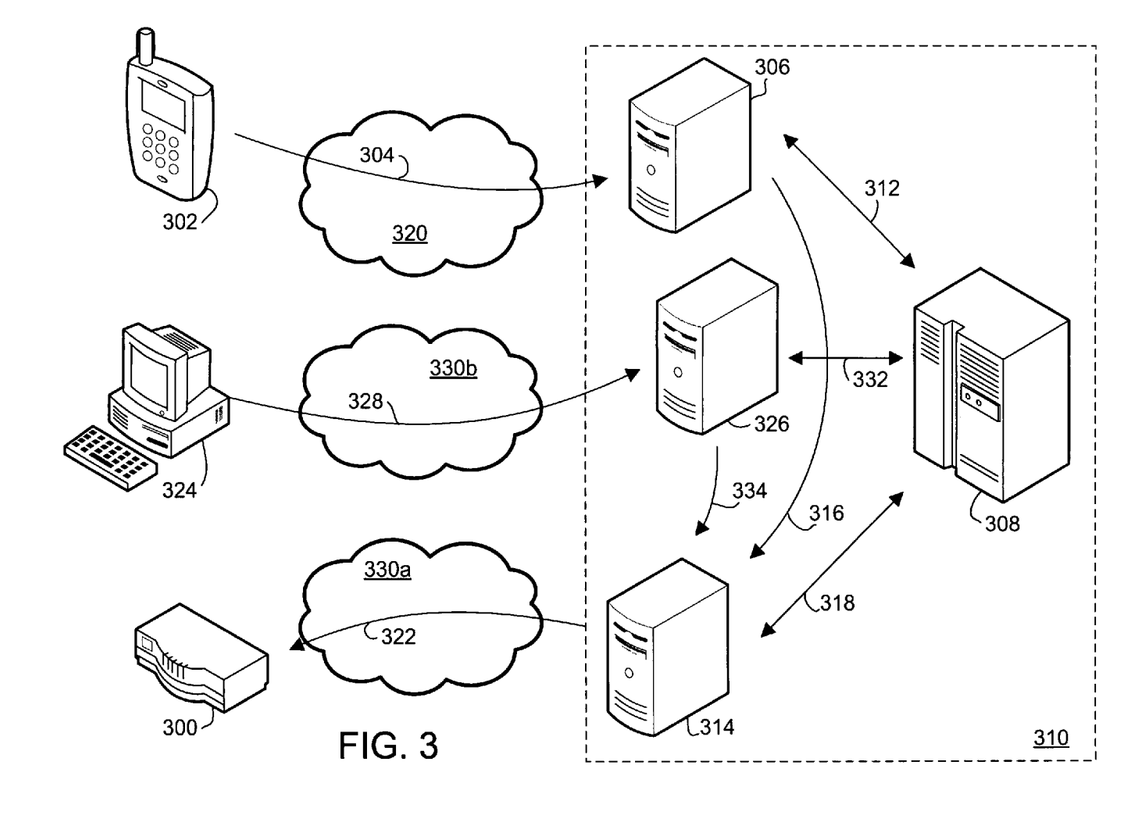
FIG. 3 is a block diagram of a user-driven provisioning system.

FIG. 3 shows two user-driven service provisioning scenarios for setting provisioning configurations on a private access point 300. In some examples, a user (not shown) uses a cell phone 302 to send a text message 304 to a text messaging application server 306 over a wireless network 320. The text message 304 contains a command to change the provisioning configuration of the private access point 300. The user may compose the command manually using his phone's usual text-messaging features, or he may use a list of pre-defined commands or a custom application to generate the message. The address to which the message is sent could be stored as a regular contact in the phone's address book feature. Any device capable of generating a text message could be used, including a cell phone, a PDA, a two-way pager, or a personal computer. The text messaging application server 306 can verify 312 the text message 304's sender's identity using an authorization and accounting (AAA) server 308. In some examples, the text messaging application server 308 and the AAA server 308 are both operated by the network operator (box 310), but either or both could be operated by third parties with communications 312 between them handled by any standard or customized communications method.

After authenticating the sender, the text messaging application server 308 forwards a message 316 including the provisioning configuration command to a provisioning configuration server 314. The provisioning configuration server 314 can perform additional checks 318 and verification with the AAA server if necessary. It alters the provisioning configuration information, as appropriate for the network operator's needs, and transmits the provisioning configuration change 322 to the private access point 300 over a wide-area network 330a, which may, for example, be the Internet or a private network. In some examples, the network operator may also provide broadband services to the user, and a single network connection may provide both the configuration change 322 and Internet access, with or without the change 322 actually being transmitted through the Internet component of the service. This process is further described below with reference to FIG. 4.

Note that for user-friendliness considerations, the user can deal with phone numbers rather than with hardware IDs. For example, the number to which the text message 304 is sent appears, to the user, to be a standard telephone number or a short telephone number as is commonly used for text-messaging-based applications. The user does not need to know or store in his phone a different type of identification for the text messaging application server 306. Furthermore, the text messaging application server 306 can infer the sender's identity by the source of the text message 304 (e.g., using caller ID) and infer which home networking device 300 to associate with the sender. In some examples, this association is established when the user first registers or activates his private access point 300 with the network operator. In some examples, a user may have more than one private access point, and the text message or custom application used to create it may include an identification of which one the user wishes to modify. For example, the user may specify an ID of the targeted access point, or may specify "all" if he wants to change the configuration of all the access points he controls. In some examples, the system may automatically determine which access points to configure. If the user provides a phone number of an access terminal that should be granted access, the system may determine that access terminal's current geographic location and provision the access terminal on all the private access points owned by that user that are within 100 miles of the access terminal.

In some examples, the user uses a personal computer 324 running web-browser software to connect to a web server 326 (arc 328) through a wide-area network 330b. The two wide-area networks 330a and 330b may both be the Internet, and may be the same or different routes through the Internet. Web traffic 328 from the computer 324 to the web server 326 may pass through the private access point 300 if the private access point 300 is also serving as an Internet gateway for the computer 324. This web server 326 may be operated by the network operator or a third party. The web server 326 can ask for username & password information to verify 332 the user's identity. Other authentication systems, such as certificates or public key encryption can also be used. Through the web server 326, the user enters provisioning configuration information. The web server 326 then forwards a message 334 including the new provisioning configuration to the provisioning configuration server 314. The provisioning configuration server 314 can perform additional checks and verification 336 with the AAA server 308, if necessary. As in the first scenario, the provisioning configuration server 314 alters the provisioning configuration information, as appropriate for the network operator's needs, and transmits the provisioning configuration change 322 to the private access point 300 over a wide-area network 330a.

In some examples, a centralized provisioning configuration server 314 is used. Unlike in some other systems, this server 314 does not gather provisioning information from the home networking equipment 300, but rather, it gets provisioning information from the network operator or from the end user using the web-based or text-messaging-based methods described above and then downloads the configuration information to the home networking equipment.

Figure 4:
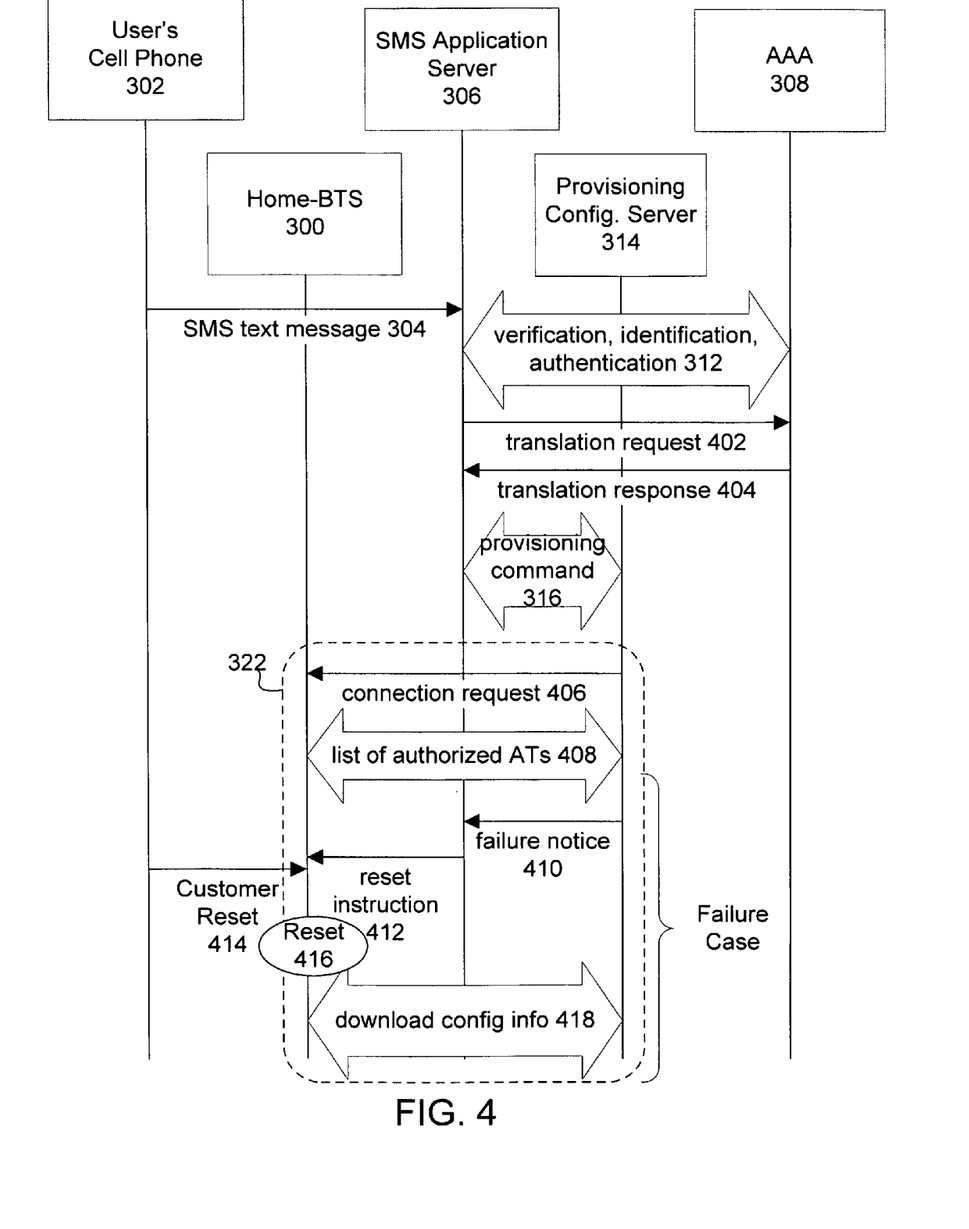
FIG. 4 shows a sequence diagram of a text-messaging-based provisioning system.

FIG. 4 shows the sequences of messages passed in the first scenario discussed above, using text messages to configure the provisioning information. As shown, the user sends a text message 304 to the SMS application server 306. The SMS server 306 communicates with the AAA server 308 to authenticate 312 the cell phone 302 used to send the message 304. One part of the provisioning command in the text message 304 may be a list of telephone numbers that the users wishes to allow to access the network through his private access point 300. The SMS server 306 sends a translation request 402 including this list of numbers to the AAA server 308. The AAA server 308 translates the phone numbers into access terminal IDs and transmits these back to the SMS server 306 in a translation response 404. The SMS server 306 then sends the provisioning command 316, including the translated access terminal IDs, to the provisioning configuration server 314. The provisioning configuration server 314 makes any changes that are required by the network operator and communicates the updated provisioning configuration 322 to the private access point 300. This process includes sending a connection request 406 to the private access point 300, sending the list 408 of authorized access terminal IDs to the private access point 300, and receiving a confirmation. If the private access point does not respond after some time-out period, a failure notice 410 is sent to the SMS server, which in turn sends an instruction 412 to the user to reset the private access point. The user performs (414) the requested reset 416. After the private access point 300 resets, it connects to the server 314 and receives its full configuration information 418, including the list 408 of authorized access terminals that failed to update earlier. A similar process could be used for the web-based provisioning shown in FIG. 3.

Other types of configuration messages may be sent, and other types of modifications may be made to them. In some examples, a user may send a message to indicate that a particular access terminal should have priority over others in accessing the radio access network through his private access point. In some examples, a user may specify a phone number of an access terminal that is not compatible with his private access point for technical or business reasons. It may be an access terminal that uses GSM, while the user's access point is part of a CDMA network, or it may be an access terminal that subscribes to a service other than the one the user subscribes to, even if they use the same technology. In either case, the system will reject the request and not provision the specified access terminal on the user's private access point. This could be communicated to the user in the form of a text message. In some examples, the operator may be willing to provide access to an access terminal from a competing network operator, assuming it is compatible, but will provision it to take a lower priority than those of its own subscribers. Other commands may be less network-focused, such as configuring the private access point to initiate a wake-up call, or simply instructing it to reset itself.

Although the techniques described above employ the 1xEV-DO air interface standard, the techniques are also applicable to other CDMA and non-CDMA air interface technologies in which access points are installed in small-scale deployments or can otherwise be configured by their users.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Other embodiments are within the scope of the following claims. The techniques described herein can be performed in a different order and still achieve desirable results.

What is claimed is:

1. A method performed by one or more network components in a macro network, the method comprising:
   receiving instructions for provisioning a personal access point based on a message originating from an access terminal;
   identifying the access terminal based on the instructions;
   determining whether the access terminal is authorized to receive services offered by a network operator;
   if the access terminal is not authorized to receive the services, disregarding the instructions; and
   if the access terminal is authorized to receive the services:
   adjusting the instructions to produce adjusted instructions that comply with one or more requirements of the macro network; and
   implementing requirements of the adjusted instructions on the personal access point to provision the personal access point, the implementing comprising transmitting, to the personal access point from a network component, data to cause an alteration in one or more access parameters of the personal access point.

2. The method of claim 1, wherein the personal access point is at least partially under control of an administrator who is not associated with the macro network.

3. The method of claim 1, wherein the access terminal comprises a portable electronic device.

4. The method of claim 3, wherein the portable electronic device comprises a mobile telephone.

5. The method of claim 3, wherein the portable electronic device is connected to a radio access network.

6. The method of claim 5, wherein the portable electronic device is connected to the radio access network through the personal access point.

7. The method of claim 1, wherein receiving the instructions comprises receiving a text message.

8. The method of claim 7, wherein the text message comprises an SMS message.

9. The method of claim 7, wherein the text message system comprises an instant message.

10. The method of claim 7, further comprising:
    identifying device management instructions within the text message.

11. The method of claim 7, further comprising:
    authenticating the access terminal by processing caller ID information associated with the text message.

12. The method of claim 1, further comprising:
    authenticating the access terminal as a user device authorized to provide the instructions.

13. The method of claim 1, wherein the instructions comprise a text message from the access terminal, and
    wherein the method further comprises authenticating the access terminal that sent the text message as a device authorized to provide the instructions.

14. The method of claim 13, wherein authenticating the access terminal comprises:
    identifying caller ID information associated with the text message;
    transmitting the caller ID information to an authorization and accounting server;
    associating a user account with the caller ID information; and
    confirming that the user account is associated with the personal access point.

15. The method of claim 14, wherein:
    confirming that the user account is associated with the personal access point comprises associating the user account with a specific personal access point; and
    implementing comprises transmitting the data to the specific personal access point.

16. The method of claim 1, wherein the instructions comprise a text message from the access terminal;
    wherein the method comprises identifying one or more personal access points associated with the access terminal; and
    wherein implementing comprises implementing requirements of adjusted instructions on the one or more personal access points.

17. The method of claim 16, wherein identifying the one or more personal access points comprises:
    locating, based on the text message, identification information for the one or more personal access points.

18. The method of claim 16, further comprising:
    locating, based on the text message, an instruction to configure all networking devices associated with the access terminal;
    wherein implementing comprises implementing requirements of adjusted instructions on all networking devices associated with the access terminal.

19. The method of claim 16, wherein identifying the one or more personal access points comprises:
    identifying a set of personal access points that are associated with the access terminal and that are associated with a particular geographic location; and
    wherein implementing comprises implementing requirements of adjusted instructions on the set of personal access points that are associated with the particular geographic location.

20. The method of claim 1, wherein identifying comprises identifying a list of access terminals based on the instructions;
    wherein the method further comprises associating each access terminal on the list with a device identification; and
    wherein adjusting the instructions comprises producing an adjusted instruction that encodes the device identifications of the access terminals on the list.

21. The method of claim 20, wherein associating the access terminals on the list with corresponding device identifications comprises:
    transmitting the list of access terminals to an authorization and accounting server; and
    receiving, from the authorization and accounting server, a list of access terminal device identifications.

22. The method of claim 20, wherein the list of access terminals comprises a telephone number corresponding to an access terminal.

23. The method of claim 1, wherein adjusting the instructions comprises:
converting the instructions to produce converted instructions that are in a format that is usable to set device configuration parameters, the converted instructions being part of the data.

24. The method of claim 1, further comprising:
determining a geographic location of the access terminal; and
determining whether the access terminal is within an area of the personal access point based on the geographic location;
wherein adjusting is also performed based on whether the access terminal is within the area of the personal access point.

25. The method of claim 1, further comprising:
determining whether a technology used by the access terminal is compatible with the personal access point;
wherein adjusting is also performed based on whether the technology used by the access terminal is compatible with the personal access point.

26. The method of claim 1, wherein implementing requirements of the adjusted instructions comprises:
transmitting an authentication signal to the personal access point; and
receiving an acknowledgment from the personal access point;
wherein transmitting the data comprises:
transmitting control parameters to the personal access point; and
instructing the personal access point to implement controls according to the parameters.

27. The method of claim 1, wherein transmitting the data comprises:
transmitting a connection request to the personal access point; and
transmitting a list of access terminals to the personal access point.

28. The method of claim 1, wherein implementing requirements of the adjusted instructions comprises:
determining that an acknowledgment was not received from the personal access point;
causing the personal access point to be reset; and
upon determining that the personal access point has been reset, transmitting the data comprising configuration instructions to the personal access point.

29. The method of claim 28, wherein causing the personal access point to be reset comprises:
transmitting a failure indication to a text messaging server; and
causing the text messaging server to transmit an instruction to reset the personal access point.

30. The method of claim 28, wherein determining that the personal access point has been reset comprises receiving a transmission from the personal access point.

31. The method of claim 28, wherein the configuration instructions include the list of access terminals.

32. The method of claim 1, wherein the personal access point is an access point of a radio access network.

33. The method of claim 32, wherein the radio access network uses an EvDO protocol.

34. The method of claim 32, wherein the radio access network uses an UMTS protocol.

35. The method of claim 1, further comprising:
if the access terminal is not authorized to receive the services, sending a failure notice.

36. A method performed by one or more network components in a macro network, the method comprising:
receiving a text message originating from an access terminal;
identifying the access terminal based on information from the test message;
determining whether the access terminal is authorized to receive services offered by a network operator;
if the access terminal is not authorized to receive the services, disregarding the text message; and
if the access terminal is authorized to receive the services:
associating the access terminal with a device identification;
generating an instruction that encodes the device identification; and
transmitting the instruction from the one or more network components to the personal access point to cause the personal access point to provide access to the access terminal, the instruction for causing an alteration in one or more access parameters of the personal access point.

37. The method of claim 36, further comprising:
if the access terminal is not authorized to receive the services, sending a failure notice.

38. A radio access network management system comprising:
a personal access point; and
a network configuration server in a macro network, the network configuration server configured to perform operations comprising:
receiving instructions based on a message originating from an access terminal, the message for provisioning the personal access point;
identifying the access terminal based on the instructions;
determining whether the access terminal is authorized to receive services offered by a network operator;
if the access terminal is not authorized to receive the services, disregarding the instructions; and
if the access terminal is authorized to receive the services:
adjusting the instructions to produce adjusted instructions that comply with one or more requirements of the macro network; and
implementing requirements of the adjusted instructions on the personal access point to provision the personal access point, the implementing comprising transmitting, to the personal access point from the network configuration server, data to cause an alteration in one or more access parameters of the personal access point.

39. The system of claim 38, further comprising the access terminal configured to transmit the message using a radio access network.

40. The system of claim 39, wherein the access terminal comprises a mobile telephone.

41. The of claim 38, further comprising the access terminal configured to transmit the message via the personal access point.

42. The system of claim 38, further comprising a text message application server.

43. The system of claim 42, wherein the text message application server is a component of an SMS system.

44. The system of claim 42, wherein the text message application server comprises an instant messaging system client.

45. The system of claim 38, wherein the network configuration server is configured to authenticate the access terminal as a device authorized to provide instructions by processing caller ID information associated with the message.

46. The system of claim 45, wherein the network configuration server is configured to authenticate the access terminal by performing operations comprising:
identifying caller ID information associated with the message;
transmitting the caller ID information to an authorization and accounting server;
associating a user account with the caller ID information; and
confirming that the user account is associated with the personal access point.

47. The system of claim 38, wherein the network configuration server is configured to adjust the instructions by performing operations comprising:
identifying, based on the message, a list of access terminals; and
associating access terminals on the list with device identifications;
wherein adjusting the instructions comprises producing an adjusted instruction that encodes device identifications of access terminals on the list.

48. The system of claim 47, further comprising an authorization and accounting server;
wherein the network configuration server is configured to associate the access terminals with corresponding device identifications by performing operations comprising:
transmitting the list of access terminals to the authorization and accounting server; and
receiving, from the authorization and accounting server, a list of access terminal device identifications.

49. The system of claim 38, wherein the network configuration server is configured to implement the adjusted instructions on the access point by performing operations comprising:
transmitting an authentication signal to the personal access point;
receiving an acknowledgment from the personal access point;
wherein transmitting the data comprises:
transmitting control parameters to the personal access point; and
instructing the personal access point to implement controls according to the parameters.

50. The system of claim 38, wherein the network configuration server is configured to implement the adjusted instructions on the personal access point by performing operations comprising:
transmitting a connection request to the personal access point; and
transmitting a list of access terminals to the personal access point.

51. The radio access network management system of claim 38, wherein the operations comprise:
if the access terminal is not authorized to receive the services, sending a failure notice.

52. One or more computer storage devices storing instructions that, when executed by one or more processing devices of a network configuration server in a macro radio access network, cause the network configuration server to perform operations comprising:
receiving instructions based on a message originating from an access terminal, the message for provisioning a personal access point;
identifying the access terminal based on the instructions;
determining whether the access terminal is authorized to receive services offered by a network operator;
if the access terminal is not authorized to receive the services, disregarding the instructions; and
if the access terminal is authorized to receive the services:
adjusting the instructions to produce adjusted instructions that comply with requirements of the macro network; and
implementing requirements of the adjusted instructions on the personal access point to provision the personal access point, the implementing comprising transmitting, to the personal access point from the network configuration server, data to cause an alteration in one or more access parameters of the personal access point.

53. The one or more computer storage devices of claim 52, wherein implementing comprises causing the network configuration server to authenticate the access terminal as a device authorized to provide instructions by processing caller ID information associated with the message.

54. The one or more computer storage devices of claim 52, wherein the operations comprise authenticating the access terminal by performing operations comprising:
identifying caller ID information associated with the message;
transmitting the caller ID information to an authorization and accounting server;
associating a user account with the caller ID information; and
confirming that the user account is associated with the personal access point.

55. The one or more computer storage devices of claim 52, wherein the operations comprise:
identifying a list of access terminals based on the message; and
associating access terminals on the list with device identifications;
wherein adjusting the instructions comprises producing an adjusted instruction that encodes device identifications of access terminals on the list.

56. The one or more computer storage devices of claim 55, wherein the operations to associate the access terminals with corresponding device identifications comprise:
transmitting the list of access terminals to an authorization and accounting server; and
receiving, from the authorization and accounting server, a list of access terminal device identifications.

57. The one or more computer storage devices of claim 52, wherein the operations to implement requirements of the adjusted instructions comprise:
transmitting an authentication signal to the personal access point;
receiving an acknowledgment from the personal access point; and
wherein transmitting the data comprises:
transmitting control parameters to the personal access point; and
instructing the personal access point to implement controls according to the parameters.

58. The one or more computer storage devices of claim 52, wherein the operations to implement the requirements of the adjusted instructions comprise:
transmitting a connection request to the personal access point; and
transmitting a list of access terminals to the personal access point.

59. The one or more computer storage devices of claim 52, wherein the operations comprise:
if the access terminal is not authorized to receive the services, sending a failure notice.

* * * * *

UNITED STATES PATENT AND TRADEMARK OFFICE
CERTIFICATE OF CORRECTION

Page 1 of 1

PATENT NO.         : 8,688,809 B2
APPLICATION NO.    : 11/640501
DATED              : April 1, 2014
INVENTOR(S)        : Shi Baw Ch'ng et al.

It is certified that error appears in the above-identified patent and that said Letters Patent is hereby corrected as shown below:

In the Claims

Column 10, Line 2, In Claim 12, after "as a" delete "user".

Column 10, Line 59, In Claim 20, after "encodes" delete "the".

Column 12, Line 56, In Claim 41, delete "The of claim" and insert -- The system of claim --, therefor.

Signed and Sealed this
Ninth Day of September, 2014

Michelle K. Lee
*Deputy Director of the United States Patent and Trademark Office*